United States Patent
Gharib et al.

(10) Patent No.: US 9,530,213 B2
(45) Date of Patent: Dec. 27, 2016

(54) SINGLE-SENSOR SYSTEM FOR EXTRACTING DEPTH INFORMATION FROM IMAGE BLUR

(71) Applicants: Morteza Gharib, Altadena, CA (US); David Jeon, Pasadena, CA (US)

(72) Inventors: Morteza Gharib, Altadena, CA (US); David Jeon, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 293 days.

(21) Appl. No.: 14/143,832

(22) Filed: Dec. 30, 2013

(65) Prior Publication Data

US 2014/0184748 A1 Jul. 3, 2014

Related U.S. Application Data

(60) Provisional application No. 61/786,177, filed on Mar. 14, 2013, provisional application No. 61/748,354, filed on Jan. 2, 2013.

(51) Int. Cl.
| | | |
|---|---|---|
| *H04N 15/00* | (2006.01) | |
| *H04N 13/02* | (2006.01) | |
| *G06T 7/00* | (2006.01) | |

(52) U.S. Cl.
CPC ... *G06T 7/0069* (2013.01); *G06T 2207/10016* (2013.01)

(58) Field of Classification Search
None
See application file for complete search history.

(56) References Cited

U.S. PATENT DOCUMENTS

| | | |
|---|---|---|
| 4,644,390 A | 2/1987 | Ochi |
| 4,675,535 A | 6/1987 | Tsunekawa |
| 6,229,913 B1 | 5/2001 | Nayar et al. |
| 6,278,847 B1 | 8/2001 | Gharib et al. |
| 6,538,255 B1 | 3/2003 | Nakasuji |
| 6,900,841 B1 * | 5/2005 | Mihara ................ G06T 5/002 348/222.1 |
| 6,993,179 B1 | 1/2006 | Weinshall et al. |
| 7,006,132 B2 | 2/2006 | Pereira et al. |
| 7,102,686 B1 | 9/2006 | Orimoto et al. |
| 7,466,336 B2 | 12/2008 | Regan et al. |

(Continued)

FOREIGN PATENT DOCUMENTS

| | | |
|---|---|---|
| CA | 2699876 | 10/2010 |
| EP | 0585098 | 3/1994 |

(Continued)

OTHER PUBLICATIONS

Chaudhuri, S., et al., "Depth From Defocus: A Real Aperture Imaging Approach", Springer, 1999.

(Continued)

*Primary Examiner* — Frederick Bailey
*Assistant Examiner* — Talha M Nawaz
(74) *Attorney, Agent, or Firm* — One LLP (57) ABSTRACT

Hardware and software methodology are described for three-dimensional imaging in connection with a single sensor. A plurality of images is captured at different degrees of focus without focus change of an objective lens between such images. Depth information is extracted by comparing image blur between the images captured on the single sensor.

14 Claims, 9 Drawing Sheets

(56) References Cited

U.S. PATENT DOCUMENTS

| | | | |
|---|---|---|---|
| 7,586,675 B2 * | 9/2009 | Sander | G02B 3/10 359/368 |
| 7,612,869 B2 | 11/2009 | Pereira et al. | |
| 7,612,870 B2 | 11/2009 | Graff et al. | |
| 7,667,768 B2 | 2/2010 | Orimoto et al. | |
| 7,711,201 B2 | 5/2010 | Wong et al. | |
| 7,819,591 B2 | 10/2010 | Rohaly et al. | |
| 7,843,429 B2 | 11/2010 | Pryor | |
| 7,843,487 B2 | 11/2010 | Tojima | |
| 7,996,793 B2 | 8/2011 | Latta et al. | |
| 8,068,095 B2 | 11/2011 | Pryor | |
| 8,111,239 B2 | 2/2012 | Pryor et al. | |
| 8,111,904 B2 | 2/2012 | Wallack et al. | |
| 8,295,546 B2 | 10/2012 | Craig et al. | |
| 8,379,101 B2 | 2/2013 | Mathe et al. | |
| 8,487,938 B2 | 7/2013 | Latta et al. | |
| 8,564,534 B2 | 10/2013 | Leyvand et al. | |
| 8,744,121 B2 | 6/2014 | Polzin et al. | |
| 9,134,126 B2 * | 9/2015 | Kimura | G01C 3/32 |
| 2002/0024500 A1 | 2/2002 | Howard | |
| 2003/0125719 A1 | 7/2003 | Furnish | |
| 2004/0136083 A1 | 7/2004 | Wang et al. | |
| 2005/0251116 A1 | 11/2005 | Steinke et al. | |
| 2007/0017993 A1 | 1/2007 | Sander | |
| 2007/0075997 A1 * | 4/2007 | Rohaly | G06T 7/0018 345/419 |
| 2007/0078500 A1 | 4/2007 | Ryan et al. | |
| 2007/0189750 A1 | 8/2007 | Wong et al. | |
| 2007/0252074 A1 | 11/2007 | Ng et al. | |
| 2007/0297784 A1 | 12/2007 | Wong et al. | |
| 2008/0232680 A1 | 9/2008 | Berestov et al. | |
| 2008/0259354 A1 * | 10/2008 | Gharib | G01B 11/2509 356/601 |
| 2009/0231278 A1 | 9/2009 | St. Hilaire et al. | |
| 2010/0138785 A1 | 6/2010 | Uoi et al. | |
| 2010/0306713 A1 | 12/2010 | Geisner et al. | |
| 2011/0025689 A1 | 2/2011 | Perez et al. | |
| 2011/0150271 A1 | 6/2011 | Lee et al. | |
| 2011/0301934 A1 | 12/2011 | Tardif | |
| 2011/0310007 A1 | 12/2011 | Margolis et al. | |
| 2012/0026349 A1 * | 2/2012 | Ishii | H04N 5/23248 348/208.4 |
| 2012/0047468 A1 | 2/2012 | Santos et al. | |
| 2012/0050157 A1 | 3/2012 | Latta et al. | |
| 2012/0076362 A1 * | 3/2012 | Kane | G06T 7/0069 382/106 |
| 2012/0236170 A1 * | 9/2012 | Li | H04N 5/23212 348/222.1 |

FOREIGN PATENT DOCUMENTS

| | | |
|---|---|---|
| JP | 11-132748 | 5/1999 |
| JP | 2002-518914 | 6/2002 |
| KR | 10-2012-0041839 | 5/2012 |
| KR | 10-2012-0109722 | 10/2012 |
| WO | WO 98/59312 | 12/1998 |
| WO | WO 02/096478 | 12/2002 |
| WO | WO 2006/009786 | 1/2006 |
| WO | WO 2007/041542 | 4/2007 |
| WO | WO 2010/028176 | 3/2010 |
| WO | PCT/US2009/004362 | 4/2010 |
| WO | PCT/US2009/004362 | 1/2011 |
| WO | PCT/US2012/059077 | 12/2012 |
| WO | PCT/US2013/078308 | 5/2014 |
| WO | PCT/US2012/059077 | 7/2014 |
| WO | PCT/US2013/078308 | 7/2015 |

OTHER PUBLICATIONS

Lowe, David G., "Object Recognition from Local Scale-Invariant Features", Proc. of the International Conference on Computer Vision, Corfu, Sep. 1999, pp. 1-8.

Nagata, et al., "Depth Perception from Image Defocus in a Jumping Spider", Science, 2012, vol. 335, pp. 469-471.

Sinofsky, E., et al., "Measurement of laser beam spreading in biological tissue scattering", Proceedings of the SPIE—The International Society for Optical Engineering, 1987, vol. 712, pp. 58-62.

Tian, Ying-Li, et al., "Absolute Head Pose Estimation From Overhead Wide-Angle Cameras", IEEE International Workshop on Analysis and Modeling of Faces and Gestures, Oct. 17, 2003, pp. 1-8.

Wu, M., et al., "Three-dimensional fluorescent particle tracking at micron-scale using a single camera", Experiments in Fluids, 2005, vol. 38, pp. 461-465.

* cited by examiner

Patch on first camera

FIG. 8A

Patch on second camera

FIG. 8B

Fourier transform of quotient

FIG. 8C

Best artificially blurred image

FIG. 8E

Number of pixels to blur (negative means reverse)

Patch on first camera

FIG. 9B

Patch on second camera

FIG. 9C

Fourier transform of quotient

Best artificially blurred image

SINGLE-SENSOR SYSTEM FOR EXTRACTING DEPTH INFORMATION FROM IMAGE BLUR

RELATED APPLICATIONS

This filing claims priority to and the benefit of U.S. Provisional Application Ser. Nos. 61/748,354, filed Jan. 2, 2013, and 61/786,177, filed Mar. 14, 2013, both of which are incorporated herein by reference in their entirety for all purposes.

BACKGROUND

Bio-inspired design represents an important engineering philosophy. However, execution of bio-inspired concepts is rarely a straight-forward endeavor.

In the matter of depth perception, for example, humans judge depth mostly from binocular stereoscopic vision, rooted in parallax. Many animals, such as octopi, do not have the same degree of binocular vision and instead employ motion parallax by moving their heads side-to-side to judge distance to an object to estimate distance to objects of interest. Even though each approach is well known, a plethora of patents have been issued involving computer advancements allowing for so-called "machine vision" based in stereoscopic depth imaging.

A more recent (and unique) example of bio-inspired design is presented in the Lytro, Inc. camera system. Taking cues from insectoid compound eyes, a sensor images with a multitude of subarrays. In reference to US Publication No. 2007/025207 to Ng et al., each subarray is associated with its own microlens to capture a small portion of the overall scene, with a portion that overlaps slightly with that of the neighboring subarrays. By comparing the differences between the captured images to determine the angle of incidence of the light detected at the different locations on the focal plane, a system can judge the distance of elements in the subject to reconstruct image focus at different depths in an image field. The approach is computationally-intensive and packaged in unconventional hardware configurations (e.g., as compared to typical commercially-available camera options).

Another process with antecedent in nature involves depth determination/estimation from the blurring of out-of-focus images. As reported by Nagata, et al. in "Depth Perception from Image Defocus in a Jumping Spider," Science 27 Jan. 2012: Vol. 335 no. 6067 pp. 469-471, the principle eyes of the so-called "Jumping Spider" have a unique retina with four tiered photoreceptor layers, on each of which light of different wavelengths is focused. The effect of layer separation, compounded by chromatic aberration of the lens, ensures that the second-deepest layer always receives defocused images. Thus, depth imaging related to image defocus was demonstrated.

Other systems describing depth-from-defocus systems are presented in each of Chaudhuri et al., "Depth From Defocus: A Real Aperture Imaging Approach," Springer, Mar. 26, 1999, U.S. Pat. No. 6,229,913 to Nayar and U.S. Pat. No. 7,711,201 to Wang, et al. and US Publication No. 2008/0232680 to Berestov, et al.

Potential depth-from-defocus imaging advantages include the ability to recover absolute depth of the scene with just two defocused images, avoidance of correspondence and occlusion problems, and depth recovery as parallel involving only simple computations without search. However, Chaudhuri comments that its estimates of depth are less accurate compared to stereo and motion-based techniques with existing approaches. Berestov, et al. and Nayar describe multi-sensors systems, with the latter additionally reliant on projected patterns of light to achieve its goals. Wong, et al. describes a system in which depth information is acquired by moving the lens a short distance and acquiring multiple images with different blur quantities.

SUMMARY

The embodiments of the systems, devices, and methods described herein seek to realize depth-from-defocus advantages, without notable hardware drawbacks (including multiple sensors given the bulk and alignment issues such setups present, and/or moving lens assemblies with associated dynamic issues as elaborated further upon below) and/or a necessary departure from conventional camera use (including standard interchangeable lens hardware use) or aesthetic. Some of these embodiments may be regarded as bio-inspired solutions. In any case, each of the embodiments in extremely practical and believed to provide significant advantages over known systems as noted above or as may be otherwise described.

In execution, the various embodiments are optionally provided in a form adaptable to standard camera imaging optics and focus packages/packaging. In other words, (apart from the subject embodiment features) specialized and/or customized lens arrangements may be avoided, thus offering greater potential for consumer adoption given the superb selection of commercially available interchangeable camera lenses.

In any case, the subject embodiments all employ a single lens/aperture system with a single sensor to image a scene to capture a plurality of images that are out of focus to different degrees. This approach reduces system cost and alleviates alignment issues that often arise with multiple-sensor imaging systems where misalignment may occur in original setup or as a result of perturbation/disturbance. Stated another way, the subject systems offer particularly robust 3D imaging solutions. Moreover, single-sensor use makes the systems amenable to down-sizing/miniaturization or for incorporation in existing camera hardware configurations.

Also, the subject embodiments operate without sensor movement or repositioning. Instead, stationary or other (non-object or non-objective lens) moving features are provided in order to produce multiple images in different degrees of focus. Without any moving parts, complexity and potential failure modes are eliminated.

When moving elements(s) are employed, these will lack the electrical connections required of a moving sensor that may otherwise be prone to fatigue and failure. Likewise, lower mass of the elements employed herein (as compared to an object or objective lens and/or sensor assembly) and thus faster operation can be achieved. Such speed can be important in capturing comparable sequential images.

The subject optical hardware (lenses, prisms, mirrors, sensors, etc.) is used in conjunction with a computer processor adapted to match elements from the images and determine depth position for elements of the images by comparing differences in blur for the elements as elaborated upon below. In the subject embodiments, the degree of defocus generated may be provided by spacing of included sensors and/or interposed micro-lens elements. Various examples are elaborated upon below.

These scene images are taken from substantially the same viewpoint (in position and/or in time) so that they can be directly compared. With features providing for imaging at varying distances/depths along a common optical axis, blurred images are sampled at different degrees or amounts of blur. By examining the relative blur/defocus between the images, the depth can be measured without a priori knowledge of the object (i.e., without knowing what the focused image "looks like").

In addition, because the images are all constructed through a common lens and any single aperture there is no feature matching problem. Rather, each image is substantially the same, other than in blur and magnification. Matching features across multiple images is therefore simplified because they will always be in predictable locations.

Accordingly, embodiments herein provide hardware and methodology for making 3D measurements with compact and relatively simple systems, with significantly reduced image processing requirements as compared to other known imaging techniques (e.g., as commented upon herein). The subject techniques may be used in connection with 3D user interfaces, machine vision, particle tracking, etc.

For 3D user interface devices, the subject system can be much more compact than systems that measure depth through either stereoscopy/defocusing or time-of-flight approaches. The subject system can be produced on-par in size with that of a single camera. Consequently, the hardware can be built into the bezel of displays or computer monitors, web cam devices, or otherwise configured. For machine vision devices, the system is compact enough to fit into relatively small spaces, so 3D machine vision would be possible in places where only 2D vision is currently employed. The elegance in design can also yield weight reduction. As such, the systems may be particularly advantageously for deployment in aerospace applications and/or miniature video cameras to record anything from surveillance to extreme sports.

The subject embodiments may employ light ranging from ultraviolet (UV) to infrared (IR). Such "light" can be pulsed or constant. Likewise, the lens components employed may be corrected for chromatic aberration. Indeed, such variations may be preferred because they may yield the sharpest full-intensity images on an unfiltered sensor.

As long as the relative blur between images can be measured, the system can measure the depth of a feature, relative to the nominal focal planes. The feature can also be located on any of the image planes or between planes and compared against the blurred images on the other planes. The depth of the imaging volume is controlled by the spacing of the sensors and the f-number of the lens/aperture, so an appropriate range vs. sensitivity compromise is possible.

The difference in blur or blur size (e.g., of an exemplary imaged "dot" blurred to different degrees) measured between the image elements may be as little as one pixel or in the sub-pixel range (e.g., as little as 0.1 pixels if the images are clean) to extract some degree of depth information. Larger differences (e.g., as created by relatively larger spacing/longer light path distance(s) between the sensor images) provide the potential for better spatial resolution and extraction of depth (Z-axis) data for reconstruction of imaged scene(s) or other purposes as noted herein by way of example.

Embodiments taking 3 sensor images are advantageous, but are often not necessary. Two images of different focus may suffice for a given purpose. Still, use of three (or more) images may improve accuracy through averaging, offering further stability (i.e., reduced uncertainty).

In one approach, one of the images may be intentionally in-focus on a certain object/depth with one or more other images defocused. Such an approach may improve system usability/applicability. One reason for this is that people are accustomed to taking focused image snapshots, thus providing the user a familiar means of composing a photograph. Another reason involves the potential to use consumer camera hardware—finding the optics of interest, finding the color, constructing a synthetic image later by true colors. With a picture taken as such, it is possible to warp the picture over a depth map of the image. Such an approach can be used to add realistic features to the constructed image.

However used, measurement of the blur can be achieved through a variety of approaches. Such determination may be accomplished by measuring blur size. For example, the system can compare the effective peak width of a given feature (by comparing the location of the peak against the half brightness point). More generally, the blur can be measured by curve fitting the features on each plane, and then comparing the different curve fits to each other. The system may alternatively use deconvolution to measure the amount of blurring needed to turn a focused/more focused feature into the blurred feature. Metrics of brightness, peak brightness alone, curvature and/or spatial frequencies may be used to measure the blurring.

To varying degrees, the subject hardware may offer some or all of the advantages over existing systems, per below.

Compact design options: the optics need take take-up only nominally more space than a single sensor;

Minimal alignment issues: the sensor portions are imaged through one lens, so alignment is simplified relative to multi-aperture and/or multi/lens systems;

Minimally aligned lighting: there is no requirement for carefully aligned lighting, the only requirement is for lighting able to illuminate the measurement volume;

Adjustable measurement volume: the range of depth can be altered by changing the effective sensor spacing, so there is minimal change to the system (no need to change camera angles or baselines); and Adjustable field of view: the field of view can be altered by changing the lens. Since the system views a scene through one lens, while the imaging sensor is fixed, it is possible to change the front optics with minimal changes.

One or more processors run software written to recognize features on the images, software to measure the relative blur of those features of the other planes, and software to measure depth from the relative blur.

The embodiments include the subject devices/systems (e.g., including the exemplary optical hardware referenced above and the addition of a computer processor and other ancillary/support electronics and various housing elements) and methods including the hardware and software embodying the same. More detailed discussion is presented in connection with the figures below.

BRIEF DESCRIPTION OF THE DRAWINGS

The figures provided herein are diagrammatic and not necessarily drawn to scale, with some components and features exaggerated and/or abstracted for clarity. Variations from the embodiments pictured are contemplated. Accordingly, depiction of aspects and elements in the figures are not intended to limit the scope of the claims, except when explicitly stated as serving the basis for elements thereof.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Figure 1:
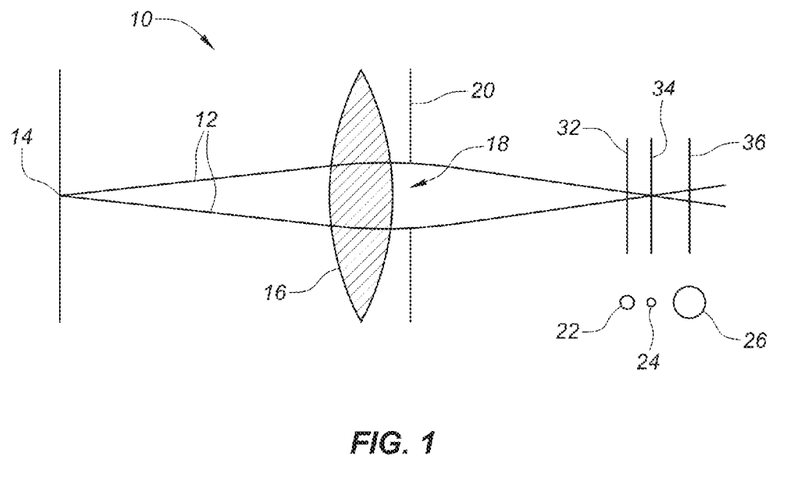
FIG. 1 is a diagram illustrating the operative principle hereof.

As applicable to the operation of the embodiments herein, FIG. 1 generically illustrates a optical arrangement 10 in which rays of light 12 from or reflected by/at an object point 14 pass through an objective lens (or lens assembly) 16 and an optional aperture 18 (e.g., of a variable iris or fixed aperture plate 20) to generate spots 22, 24, 26 at various corresponding image planes 32, 34, 36 or sensor distances. At plane 34, spot 24 is in focus (or closest to focus)—as such image plane is at or near the system focal plane. Spot 22 is out of focus in front of the focal plane, and spot 26 is out of focus behind the focal plane. As such, spots 22 and 26 may alternatively be referred to as "blurs" or "blur images/points".

With a plurality of image sets including such points, three-dimensional data can be determined in connection a processor adapted to match elements (such as the points/spots) from captured images and determine depth position for the elements within the images by comparing differences in their size. Given the optical arrangement, the images are taken from substantially the same viewpoint and are out of focus to different degrees. The images are captured in the various embodiments without moving a lens.

Before describing embodiments operable/operating with such characteristics, it is noted that (e.g., in imaging a natural scene) the spots and/or blurs are typically not representative of isolated points. They may be features recognized, as such, but need not be since the approach always is run with knowledge of which area of the image to compare to infer depth. Therefore, any generic feature-finding algorithms may suffice, such as edge detection, brightness thresholding and/or curvature thresholding. Still, it is noted that the imaged elements may in fact be points or speckles as provided by contrast material spray, applied carbon powder, projected optical dots or any pattern, etc. as variously known in the art.

Figure 2A:
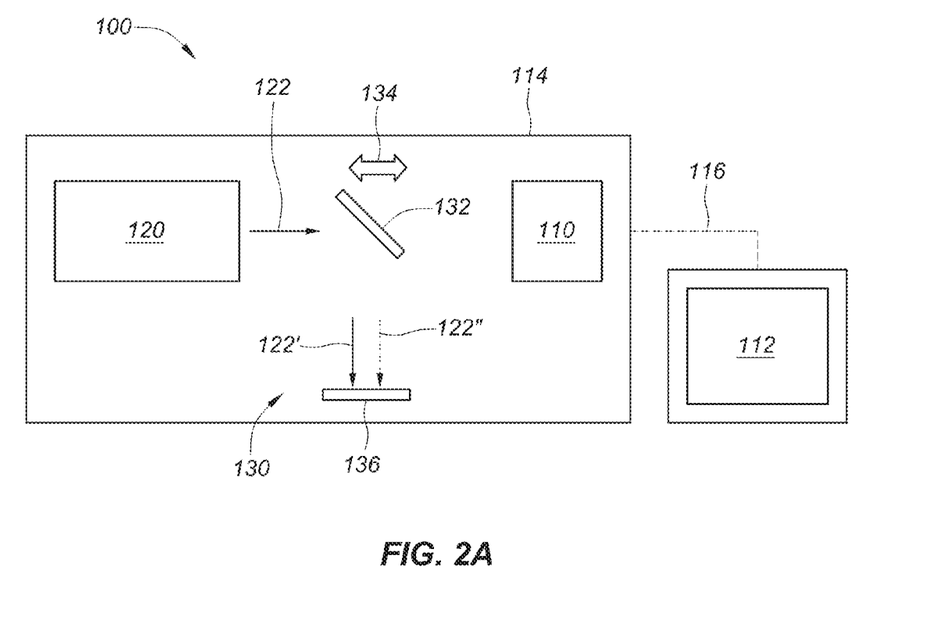
FIG. 2A is a block diagram of a system with a moving reflective element.

As for the subject hardware aspects, FIG. 2A illustrates an embodiment in connection with optional associated hardware. Here system 100 includes a computer processor 110 and an optional output display 112. The display may be a stand-alone display in an imaging system, a TV display if the imaging system is used for video game, etc. control, an LCD integrated in the back of a video or still image camera, etc. As such, (though not shown) an optional housing 114 may encase the display. The display may be in electronic communication with associated hardware via a wired or wireless connection 116. A lens or lens and aperture assembly 120 transmits light (indicated by arrow 122) to an image system 130.

System (or sub-system) 130 employs a mirror (or prism) 132 translated axially (e.g., by a piezoelectric or other transducer "switch" 134) to near and far focal distances/positions for imaging. Intermediate position(s) for imaging are possible as well. Action of the slide or switch 134 causes incoming light 122 to be imaged on different (but preferably "overlapping") parts of a single sensor 136. This movement permits imaging with beams 122' and 122" centered along different length optical paths to achieve different focal distance images (and, hence, different degree/level of blur) while imaging on the same sensor image plane.

Notably, the additional sensor length/width required for scanning across the sensor surface only represents a minor space inefficiency when the two (or more) different images are captured/taken with the sensor. A meaningful offset between captured images results in a change of blurring by as little as 3 pixels (1 center pixel and 2 on either side), but greater translation may be utilized for greater defocus separation and consequent depth resolution. Essentially, the minimum should be related to the smallest change in blur that can be used in a given application.

Figure 2B:
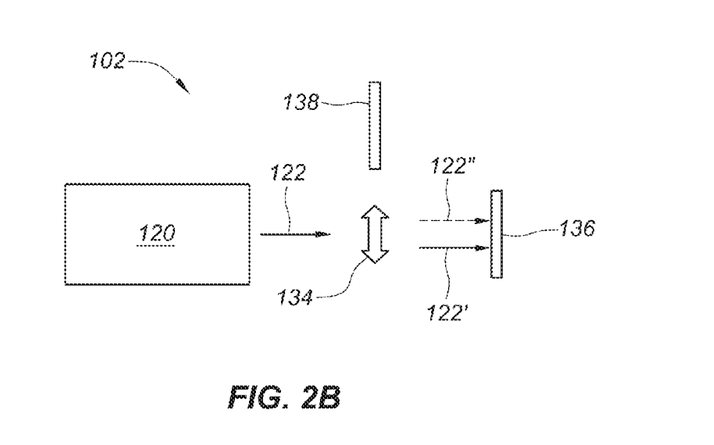
FIG. 2B is a block diagram of a system with a moving refractive element.

As shown in FIG. 2B, such an offset can be obtained by another moving element approach. Yet, still without moving the objective lens assembly.

Specifically, system 102 (illustrated absent computer and ancillary hardware notation shown in FIG. 2A but applicable and contemplated for use in connection with every one of the subject systems) includes a mobile glass element 138 to be interposed between the objective lens assembly 120 and sensor 134. This glass plane or pane may be actuated by any of a variety of actuators 132, including but not limited to those providing oscillation translation (e.g., as in solenoid or piezo-based units) and rotation (e.g., as in electric motor-based units). Moreover, element 138 can operate anywhere between the aperture and the sensor (where the aperture could be inside the lens system).

The "glass" element may comprise any suitable optically transparent material (including plastics) that have an index of refraction different than 1. Still further, while it is optionally describe as a plane or pane (and hence—impliedly—flat), refractive element 138 it may have curvature thereto.

In both of the systems above, exposure time to light must be managed because preferred system operation requires that the different captured image frames are substantially identical. Thus, sampling rates should generally at 10 Hz or higher. For recording faster moving objects and/or scenes, 100 Hz, 1000 Hz or higher may be preferred.

In the FIG. 2A embodiment 100 exposure time of the sensor should be limited to avoid image "smearing" due to motion (if any associated with the object and/or from panning the camera). Indeed, exposure time in any of the embodiments should be selected to avoid the same.

Similarly, in the FIG. 2B embodiment 102, glass movement desirably allows for full-frame images to be taken with element 138 fully in place and then fully removed. Alternatively, (although slightly more complex, but potentially useful in highly space-constrained applications) the glass can be half size and switch back and forth across the sensor so that half of each image is affected.

Ultimately, each of the embodiments described has its own trade-offs. These differences may make one system more suitable than another in a given application.

Figure 3A:
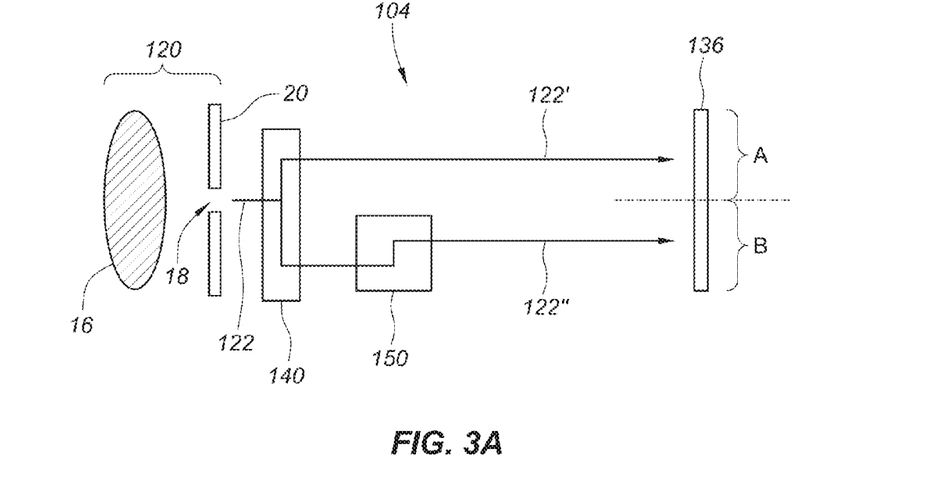
FIGS. 3A and 3B are block diagrams systems without moving elements for capturing side-by-side images with different blur.
Figure 3B:
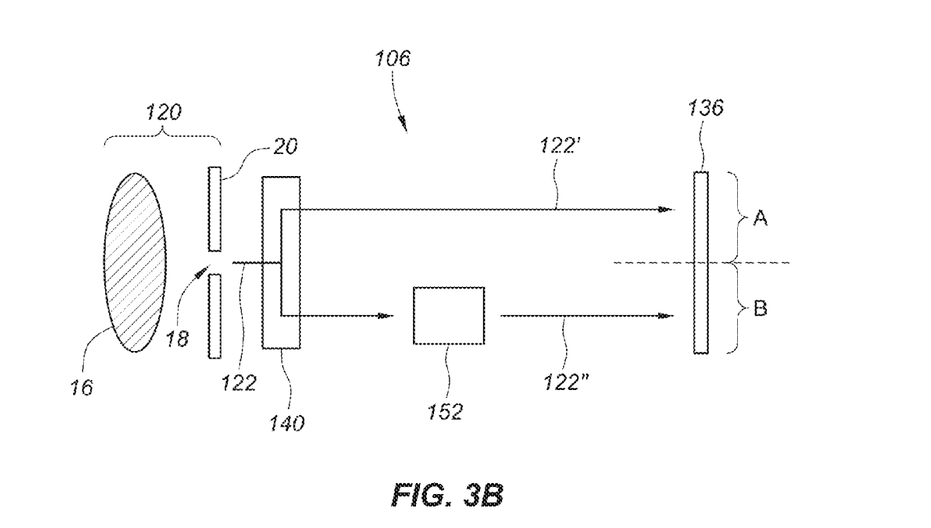

Accordingly, FIGS. 3A and 3B illustrate two "split-sensor" embodiments 104, 106. In each, different optical path lengths 122' and 122" are provided to each part of a sensor 136 after light passes through a beam splitter 140. System 102 in FIG. 3A achieves a longer length for sensor portion 134B by way of additional mirrors or prisms in a jog or switchback 150 (i.e., a folded optical delay line) inserted in the beam 122" path to physically extend its length. System 150 in FIG. 3B achieves an optical delay difference (operating, in effect, as a lengthening of beam path 122") between each part of the sensor by inserting a high index material, such as a glass element 152, in the optical path. In either embodiment, the optical delay 150/152 element may be spaced apart from the sensor (as shown) or placed directly in contact with the sensor.

Notably, there will typically be no physical separation between sensor portions "A" and "B" of the sensor. Rather, they may be considered as discrete for embodiments in which the optical paths 122' and 122" are directed to achieve imaging with no overlap. However, the system may be modified to include coordinated on/off signal switching (e.g., using a mechanical shutter, a toggling mirror, LCD "windows" or otherwise) to provide time-wise separation of imaging to allow capturing the image on overlapping (i.e., completely or partially-overlapping) sensor sections.

Figure 4:
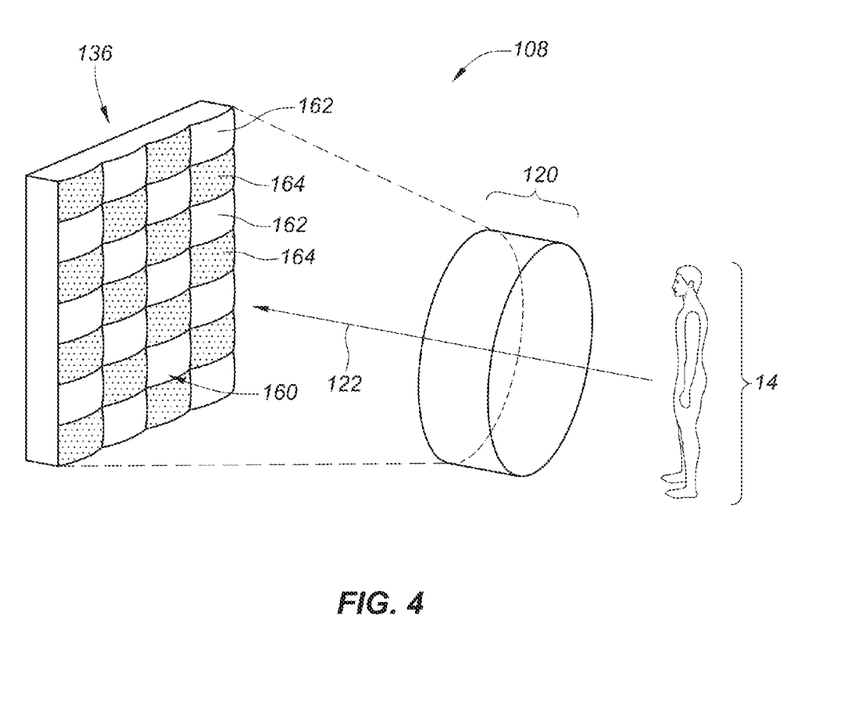
FIG. 4 is schematic of image projection on a sensor covered by a micro-lens matrix containing at two or more micro-lens sets of different focal lengths.

In any case, FIG. 4 illustrates another embodiment 108 in which separate sectors of a single image sensor 136 capture light coming from an object point or points 14 at different focal/blur states. This embodiment employs a matrix 160 of micro lenses 162/164 placed to cover a single or plurality (i.e., set of) of pixels on an imager. The micro-lens units on the matrix may have two different focal length arrangements (e.g., as shown) where, for example, neighboring micro lenses with different focal points cover corresponding neighboring pixels on the sensor. In another arrangement, depending on pixel color assignment (say by use of a Bayer filter) or other assignment of pixels, a single micro-lens may cover a set of corresponding pixels (under similar assignments). In another arrangement, such sets/collections of pixels with the same assignment may be covered by a set of individual micro lenses with the same focal length.

Assigning a subset of pixels with no micro-lens coverage is also contemplated. Such a configuration may be provided for the purpose of positioning or identifying the target subject through the frontal normal camera optics or otherwise. On a camera system with SLR arrangement where the focusing is done through direct optical view, such assignment would not be necessary.

Whatever the variation, the purpose of having the above-mentioned micro-lens systems with two or more focal lengths is to provide two or more blurred images for extracting the depth information for a given scene as described below. As such, the methodologies and associated hardware options presented in the FIG. 4 embodiment (together with its optional variations) are quite distinct from that/those of Lytro system noted above.

Software Methods

Figure 5:
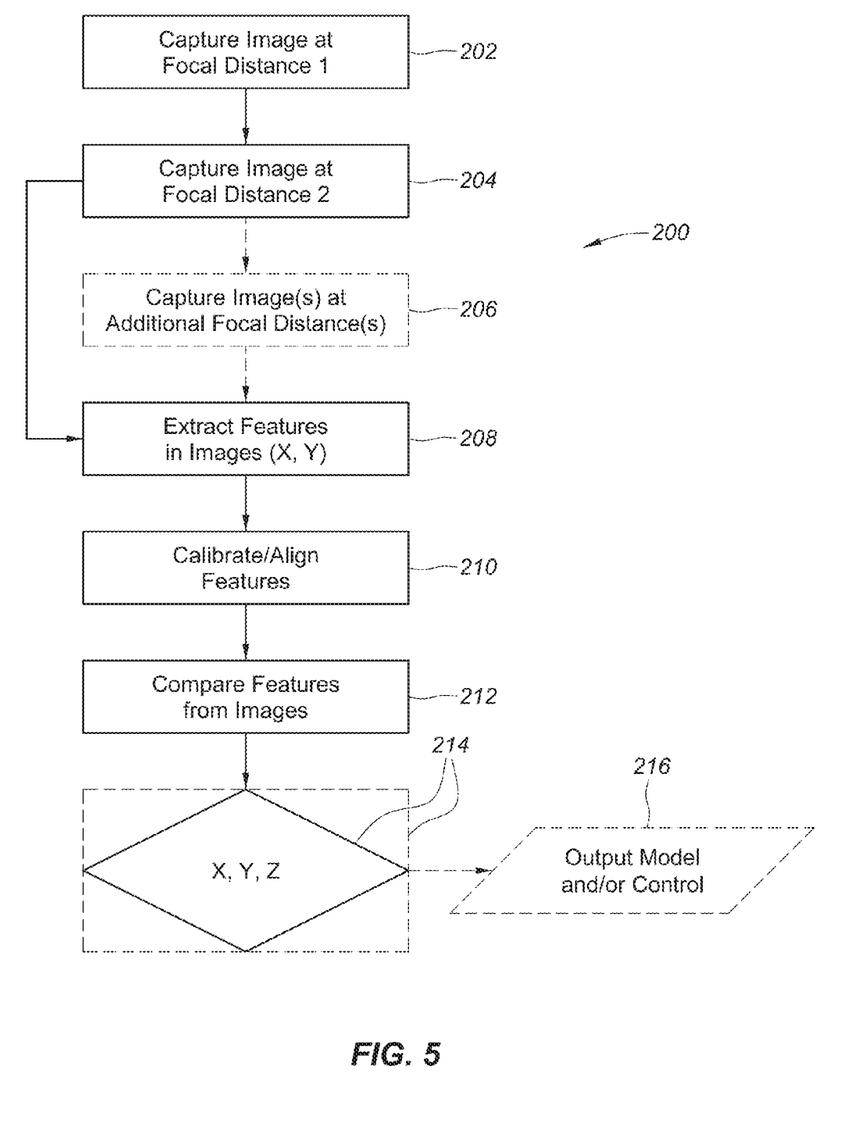
FIG. 5 is a flowchart detailing subject method variations.

Any of the subject systems may be operated in accordance with the software methodology detailed in FIG. 5. Such methodology as may be embodied in software instructions to run on a computer processor as variously described below.

In a process 200, a first image (such as including point 22) is captured at 202 for a first focal distance. At 204, a second image is captured (such as including point 24) for a second focal distance. At 206, a third image is optionally captured (such as including a point 26) for a third focal distance. As indicated at 206, a number of other (e.g., of 4th, etc.) images at other distances may be captured as well. All of these images are typically captured along the same optical path or axis. They may be taken simultaneously or not per the discussion above. Any of these images are optionally captured "in focus" for an area or features of interest. Some of the potential advantages associated with such use are also noted above.

In some variations, features (optionally—all such features) from these images are extracted at 208. This may yield X and Y components and selected information included as a measure of blur for notation and/or tabulation for processing. At 210 (or elsewhere in the process) a calibration step may be employed to align the features from the multiple images. At 212 the features (or other applicable data) from the different image depths (optionally referred to as channels) are compared and a determination of Z axis information (depth) is made to be output at 214. Such output may terminate the process or serve as an intermediate step (as indicated by the diamond vs. box annotation) for a further output of a model of an imaged object, control signal for other hardware, aggregated display or other computer-readable signal at 216.

Example

Figure 6A:
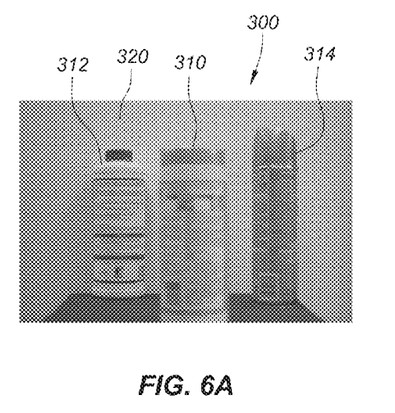
FIGS. 6A and 6B are images of a scene taken with an embodiment like that in FIG. 2B.
Figure 6B:
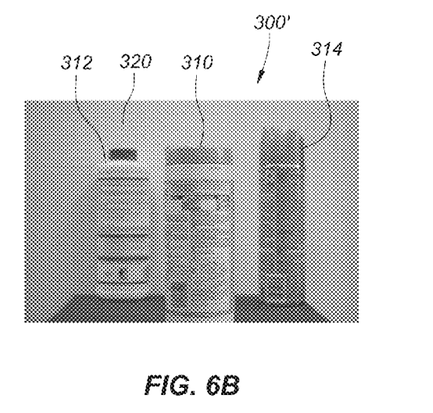

Image sequences 300, 300' of bottles/cans at different blur levels were taken as shown in FIGS. 6A and 6B. The difference in blur between the two different images was achieved by inserting a 2.75 mm thick flat glass pane in an SLR camera between the lens and image sensor so as to change the effective focal plane. The center can 310 is better focused in FIG. 6B image than in FIG. 6A. The left 312 can is better focused in FIG. 6A vs. FIG. 6B. The right can 312 is in similar focus in each image.

Two dots of a calibration grid 320 behind the cans were matched and used as fiducials (or markers). Linear interpolation was used to artificially resample the image to improve their alignment. Correspondence was solved by estimating the location of corresponding grid points (i.e., centroiding or center detection—although such techniques could be applied) with and estimated error of 3 pixels. The images were converted to grayscale. Patches of size 200×200 pixels were extracted from these images. These patches were mean subtracted to avoid errors in the DC frequency term. The patches were further multiplied by an apodization function in image space to soften errors resulting from imperfect registration. (The apodization function "rolls-off" the edges to zero signal smoothly.) These activities produced processed patch pairs, with one patch from each image 6A, 6B.

Two methods were used to identify the depth of each patch pair from the relative blur. The first involved Fourier techniques and the second the Difference in Gaussian(s).

In the Fourier approach, we assume that the two images are related by $$g(x)=f(x)*N(0,w)$$

with g and x being the images, the star being convolution and N being a Gaussian distribution. We measure w in the Fourier domain by calculating the quotient $$Q(x)=F\{g(x)\}/F\{f(x)\}$$

The theory predicts that the result of this will be a Gaussian with width proportional to 1/w. More blur corresponds to a narrower Gaussian in Q.

The Difference of Gaussian offers a more direct method, without explicitly appealing to the Fourier domain. In the difference of Gaussian approach, a less blurry image f(x) is taken and blurred with Gaussians of different widths w until the w that best matches the other image g(x), in the RMS sense, is identified. RMS error can then be plotted against width w, and the "predicted" image f(x)*N(0, w) can be displayed observe how it actually matches against g(x). Although this method is not computationally efficient because it requires dozens of convolutions, it provides a variation that be described making use of Parseval's theorem which is much faster.

Figure 7A:
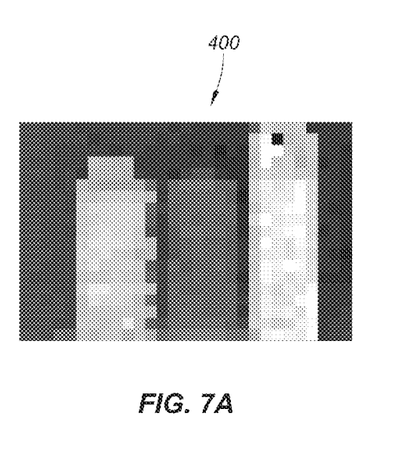
FIGS. 7A and 7B are depth-map images of the scene in FIGS. 6A and 6B produced using different exemplary computational techniques.
Figure 7B:
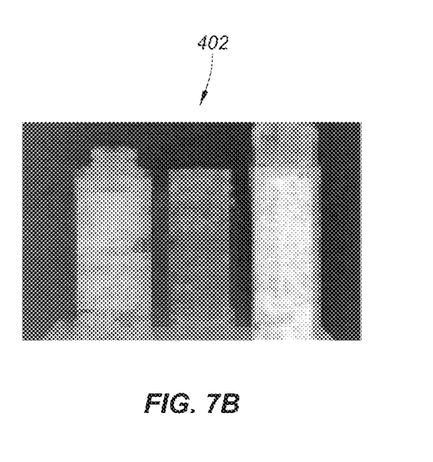
Figure 8A:
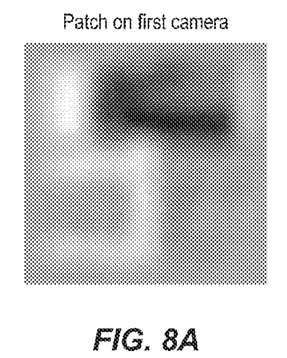
FIGS. 8A, 9A and 10A are pixel selections from the image in FIG. 6A.
Figure 8B:
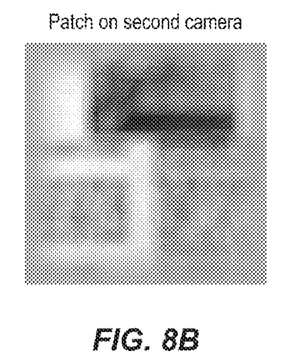
FIGS. 8B, 9B and 10B are matching pixel selections taken from the image in FIG. 6B.
Figure 8C:
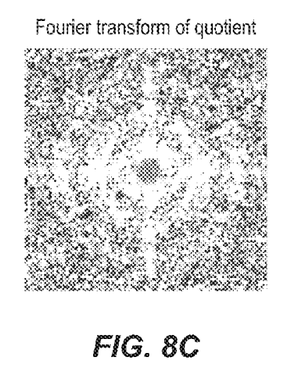
FIGS. 8C, 9C and 10C are Fourier Transform Quotient plots.
Figure 8D:
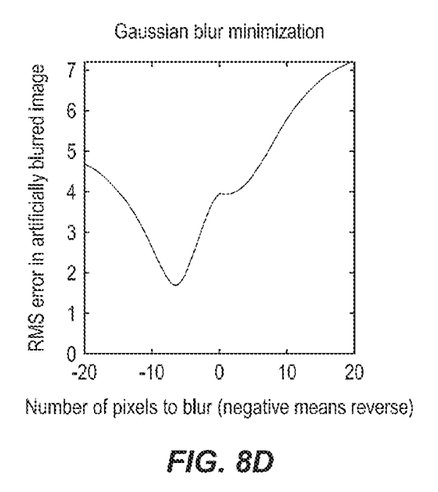
FIGS. 8D, 9D and 10D are Gaussian Blur Minimization plots.
Figure 8E:
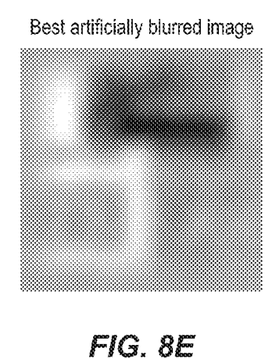
FIGS. 8E, 9E and 10E are best-match results for the plots shown in FIGS. 8D, 9D and 10D.
Figure 9A:
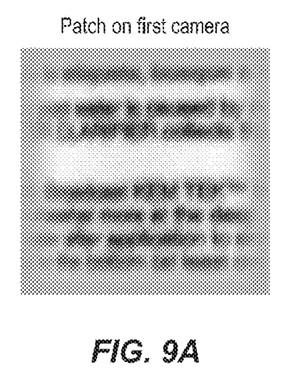
Figure 9B:
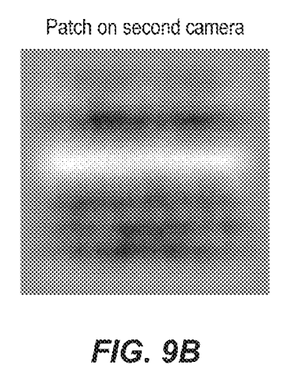
Figure 9C:
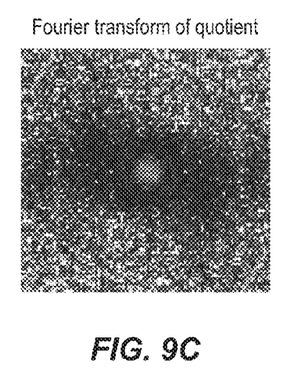
Figure 9D:
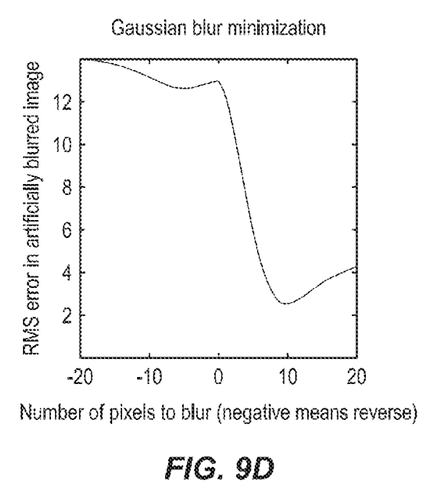
Figure 9E:
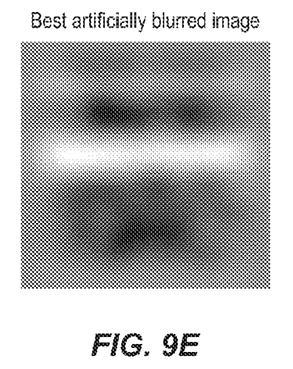
Figure 10A:
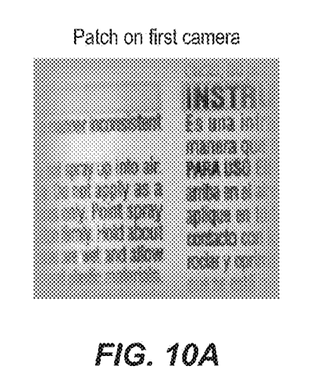
Figure 10B:
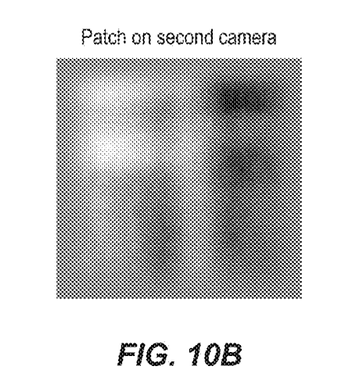
Figure 10C:
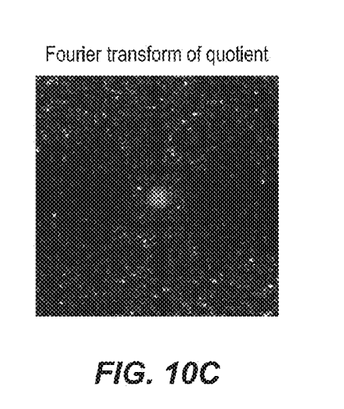
Figure 10D:
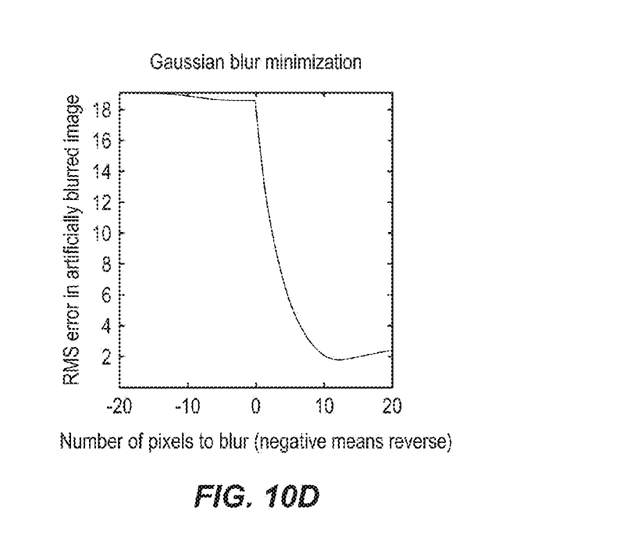
Figure 10E:
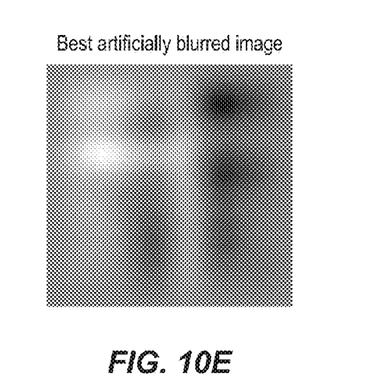

First and second depth maps 400, 402 are shown in FIGS. 7A and 7B, each produced with the Gaussian approach. The images are tiled into 100×100 patches, and the optimal width w is determined in each patch. The typical Gaussian widths that are seen in FIG. 7A are at about 10 pixels. FIG. 7B shows the same image as in FIG. 7A but using iterations with a depth map based on the FFT quotient. FFT is a faster implication of the above mathematics for direct correlation.

The data processing in the above approach is presented in connection with FIGS. 8A-10E. Here, each row (FIGS. 8A-8E, FIGS. 9A-9E and FIGS. 10A-10E) represents one observation (i.e., one 200×200 pixel "patch"). The left two columns (i.e., FIGS. 8A, 9A, 10A and FIGS. 8B, 9B, 10B) show the processed patches from the two different camera images (corresponding to "near" and "far" camera images from FIGS. 6A and 6B, respectively). The middle column (i.e., FIGS. 8C, 9C and 10C) shows Q, the Fourier Transform Quotient, and the last two columns (i.e., FIGS. 8D, 9D, 10D and 8E, 8E and 10E) implement the Difference of Gaussians approach. Negative values in the Gaussian blur minimization plots shown in FIGS. 8D, 9D and 10D correspond to the left patch image being blurrier than the right patch image. The image corresponding to the best blur (width) from the Difference of Gaussians method is then plotted in FIGS. 8E, 9E and 10E and is nominally the match the blurrier of the two patches.

Variations

In addition to the several embodiments that been disclosed in detail above, still more are possible within the classes described and the inventors intend these to be encompassed within this Specification. The Specification describes specific examples to accomplish a more general goal that may be accomplished in another way. This disclosure is intended to be exemplary, and the claims are intended to cover any modification or alternative which might be predictable to a person having ordinary skill in the art.

Those of skill would further appreciate that the various illustrative logical blocks, modules, optical circuits, and algorithm steps described in connection with the embodiments disclosed herein may be implemented as optical hardware, electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the example embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, DisplayPort, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and BLU-RAY disc where disks usually reproduce data magnetically, while discs reproduce data optically with lasers. Combinations of the above should also be included within the scope of computer-readable media.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

It is also noted that all features, elements, components, functions, acts and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

Reference to a singular item, includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the claims shall allow for the inclusion of any additional element irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

Accordingly, while the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations (as referenced above, or otherwise) that define the inventive scope of the claims by features, functions, steps, or elements that are not within that scope.

The invention claimed is:

1. A three-dimensional imaging system comprising:
a single image sensor;
optics adapted to allow the single image sensor to capture images of an object in a scene along a common optical axis, wherein the optics are adapted to allow the single image sensor to capture the images such that they are focused to blur in different degrees without a change of objective lens focus or position of the object, wherein the optics comprise a beam splitter and an optical delay, the optical delay adapted to lengthen a beam path to the single image sensor;
a computer processor connected with the single image sensor; and
a non-transitory computer readable medium having instructions stored thereon, which, when executed cause the computer processor to:
match elements from the images; and
determine depth position for elements of the images by a comparison of differences in blurring for the elements.

2. The system of claim 1, wherein the optics comprise a moving element selected from a reflective element and a refractive element.

3. The system of claim 1, wherein the delay is based on an optical switchback.

4. The system of claim 1, wherein the delay is based on material refractive index.

5. The system of claim 1, wherein the optics comprise an array of micro-lenses.

6. The system of claim 5, wherein portions of the single image sensor are uncovered by the array.

7. The system of claim 5, wherein the array includes micro-lenses of at least two focal lengths.

8. The system of claim 1, further comprising a single objective lens assembly.

9. A method of three-dimensional imaging comprising:
capturing, with a single image sensor, a plurality of images of an object in a scene along a common optical axis, wherein the plurality of images are captured at different focuses without moving a camera objective lens focus or a position of the object, wherein light incident on the single image sensor passes through a beam splitter and an optical delay, the optical delay adapted to lengthen a beam path to the single image sensor; and using a computer processor, matching elements from the images and determining depth position for the elements of the images by comparing differences in size for the elements.

10. The method of claim 9, wherein the images are captured in a time-separated fashion on overlapping portions of the image sensor.

11. The method of claim 10, further comprising moving a refractive or reflective element to allow the images to be captured in a time-separated fashion.

12. The method of claim 9, wherein the images are captured simultaneously on different portions of the image sensor without overlap.

13. The method of claim 12, wherein the different focuses are captured at different-distance image planes on the image sensor.

14. The method of claim 9, employing a system as described in any of claims 1, 2, and 5-9.

* * * * *